F. K. HURXTHAL.
DRAG BAR MOUNTING.
APPLICATION FILED MAR. 2, 1916.
1,208,786.
Patented Dec. 19, 1916.
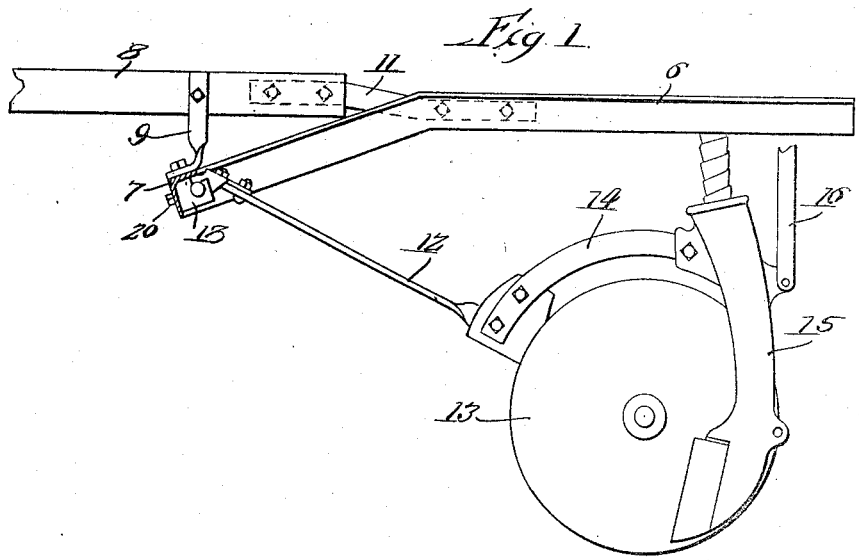
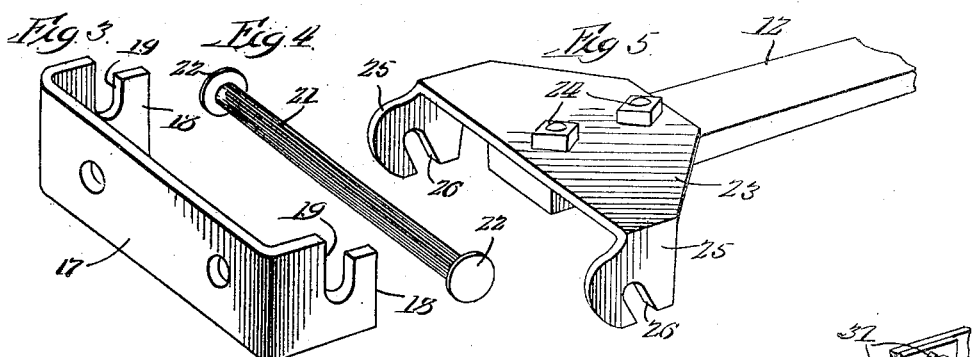
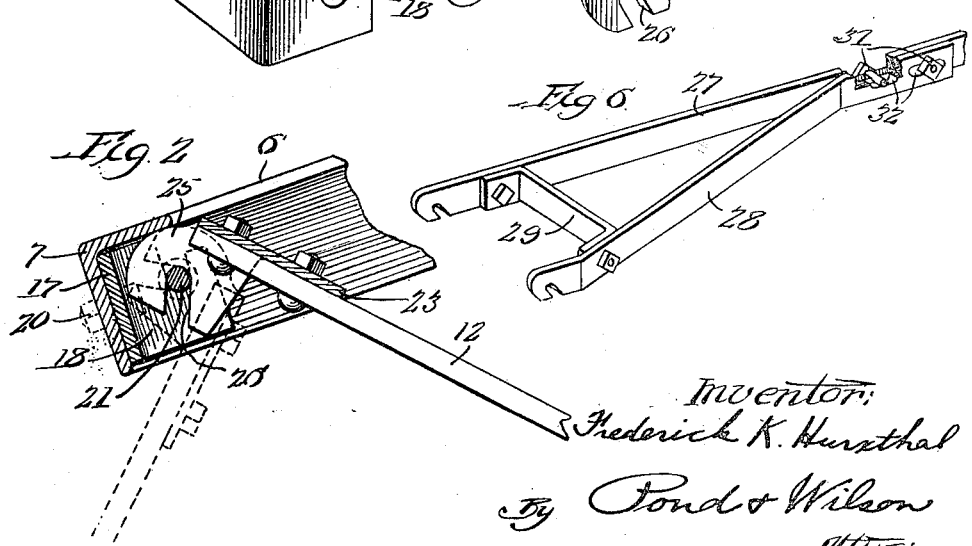
Inventor:
Frederick K. Hurxthal
By Pond & Wilson
Attys.

UNITED STATES PATENT OFFICE.

FREDERICK K. HURXTHAL, OF ROCKFORD, ILLINOIS, ASSIGNOR TO EMERSON-BRANTINGHAM COMPANY, OF ROCKFORD, ILLINOIS, A CORPORATION OF ILLINOIS.

DRAG-BAR MOUNTING.

1,208,786.  Specification of Letters Patent.  Patented Dec. 19, 1916.

Application filed March 2, 1916.  Serial No. 81,674.

*To all whom it may concern:*

Be it known that I, FREDERICK K. HURXTHAL, a citizen of the United States, residing at Rockford, in the county of Winnebago and State of Illinois, have invented certain new and useful Improvements in Drag-Bar Mountings, of which the following is a specification.

This invention relates in general to grain drills, fertilizer sowers and the like, and has more particular reference to the manner of mounting the drag bars on the machine frame, and while I have shown my invention in the present application as embodied in a grain drill it should be understood that it is applicable to other types of machinery where a similar mounting may be desirable.

In grain drills as constructed prior to my present invention the drag bars have been bolted at their forward ends to the machine frame in such a way that they were capable of vertical swinging movement about their forward ends sufficient to accommodate the normal raising and lowering movements of the drill disks and boots.

As is well known, grain drills are customarily shipped in knocked down condition from the factory to the agent who assembles them for the farmer. As each drill comprises ten or more drag bars, depending upon the size of the drill, it will be manifest that it required considerable time to bolt the forward ends of all these drag bars to the frame during the assembling of the machine. Furthermore, the nuts on these bolts frequently came loose and were sometimes lost when the drill was in use. Another difficulty was the drag bar heads which were customarily cast and which sometimes were broken by rough handling in shipment.

One of the primary objects of my present invention is to provide a drag bar mounting or, in other words, a connection between the forward ends of the drag bars and the drill frame which will enable the drag bars to be attached to the frame with a minimum expenditure of time and labor and without the employment of any threaded bolts and nuts.

Another object is to provide a drag bar improved in construction, in which the rear or disk-carrying end of the drag bar may be laterally adjusted with respect to its forward end whereby to adjust the disks of a series relatively to each other to obtain uniform spacing between the disks.

A further object is to provide a mounting which will not only be simple in construction and easy to assemble but which will be exceedingly strong, durable and serviceable and will permit freedom in the vertical movements of the drag bars while retaining them rigidly against lateral displacement.

Other objects and advantages of the invention should be readily apparent to those skilled in the art as the same becomes better understood by reference to the following description when considered in connection with the accompanying drawings.

Referring to the drawings—Figure 1 is a side view of a portion of a grain drill embodying my invention, the cross member of the main frame being shown in section; Fig. 2 is an enlarged fragmentary view of one of my improved mountings showing the manner of assembling the same; Figs. 3, 4 and 5 are detail perspective views of the bracket, pivot member and drag bar head respectively; and Fig. 6 is a fragmentary view in perspective of a form of drag bar employing my improved mounting and constructed so that its rear end may be adjusted laterally with respect to its forward end.

On the drawings reference character 6 indicates the main frame of a grain drill which frame is preferably of angle iron construction, as shown, the cross member 7 being preferably of integral construction with the remainder of the frame and depressed relatively to the side members by bending the forward ends of the side members downwardly, as shown in Fig. 1. The rear end of the pole or poles 8, as the case may be, is supported from the transverse frame member 7 by an upright 9 and is braced laterally by a brace member 11 bolted to the rear end of the tongue and to the side member of the frame. The drag bar 12, which is connected at its forward end to the cross member 7 in a manner which will be later described, carries at its rear end the disk 13 and also an arm 14 upon which the boot 15 is mounted. The details of the disk and boot are immaterial so far as my present invention is concerned. The boot and disk are raised and lowered by well known mechanism through the intermediary of the link 16.

A bracket 17 having rearward extensions 18, each provided with a vertical open-ended slot 19, is fixedly secured to the frame member 7 by bolts 20 or other suitable fastening means. It will be observed from Fig. 2 that the slots 19 are disposed substantially beneath the horizontal flange of the angle member 7, and the upper corners of the extensions 18 are cut away, as shown in Fig. 3, to permit the insertion of a pivot member 21 provided at its ends with heads 22 beneath the flange of the frame member so that the pivot member may be positioned in the slots 19, as shown in Figs. 1 and 2. The drag bar 12 is provided at its forward end with a head 23 shaped as shown in Fig. 5, which head is securely fastened to the drag bar by bolts 24 or other preferred fastening means. The head is provided at each side with forwardly and downwardly projecting ears 25, each provided with a downwardly extending open-ended slot 26 of suitable size to snugly engage the pivot member 21, the ears 25 being spaced apart so as to fit just inside the extensions 18 of the bracket 17.

While I have shown in the drawings and have described but one drag bar and mounting it should be understood that each drag bar of the drill is mounted in a similar manner. The brackets 17 are secured in position on the machine frame at the factory and the heads 23 are likewise secured to the drag bars. When the machine is shipped the drag bars, with the disks and boots assembled thereon, are crated separately from the machine frame, and the pivot members 21 are also packaged separately. In assembling the machine after the wheels have been put on, the pivot members 21 are slipped into position in the slots 19. The front end of the frame is then elevated sufficiently to permit the heads 25 to be engaged with their respective pivot members 21 by positioning them in the position shown in dotted lines in Fig. 2. When in this position the ears 25 of the drag bar head may be engaged with the pivot member whereupon the drag bar is swung rearwardly into the normal operative position shown in full lines in Fig. 2. It will be observed that the forward and upper portions of the ears 25 are curved concentrically with the bottoms of the slots 26 and that they are proportioned so that they engage the overlying flange of the frame member 7 with just sufficient friction to hold the drag bar head and the pivot member 21 in operative relation and against vibration while still allowing the drag bar to swing on its pivot so that the disk attached to the drag bar may rise and fall during operation. It will be apparent that when the drag bars are in normal position, as shown in full lines in Fig. 2, this flange prevents disengagement of the ears from the pivot member and holds the pivot member in position in the slots 19 so that there is no possibility of the mounting becoming disengaged or detached from the frame when the machine is in operation. Should it become necessary at any time to remove one of the drag bars this may be readily accomplished by lifting the forward end of the frame and swinging the drag bar forwardly into the position shown in dotted lines in Fig. 2, whereupon the drag bar head can be withdrawn from the pivot member.

In Fig. 6, I have shown another form of drag bar adapted to be mounted on a frame in a manner similar to that of the drag bar 12. In this instance, however, the drag bar while in effect being a rigid bar, is formed of two sections 27 and 28 having their front ends shaped and slotted the same as the ears 25 of the heads 23 and spaced by a brace 29 a distance similar to the spacing of said ears 25 so that the sectional form of drag bar is adapted to be attached to and held in connection with the members 7, 17 and 21 in the same way as the first described form of drag bar. The sections 27 and 28 converge rearwardly and are connected at the junction by bolts 31 which pass through round holes in the section 27 and elongated holes 32 in the section 28. By this construction, tightening of the nuts on the bolts holds the two drag bar sections rigidly together, and loosening the nuts permits the sections to be adjusted relatively by shifting the rear ends of the sections laterally with respect to their forward or pivoted ends. I make such adjustment of the drag bar when occasion requires to properly position its disk relatively to the adjacent disks of the series, and the nuts on the bolts will be tightened to clamp the sections of the drag bar fixedly together in the desired set position.

It will be manifest that with my improved mounting the drag bars can be very quickly attached to the frame, as all that is necessary is to hook the drag bar heads over the pivot members and swing the drag bars rearwardly, thereby automatically locking them in position. The time and labor required to attach the drag bars to a drill frame by means of my novel mounting is only a fractional part of that required to bolt the drag bars onto the frame in the old way. Both the brackets 17 and the drag bar heads 23 may be stamped out of metal at a low cost, and the headed pivot members 21 can also be manufactured very cheaply. The spacing of the ears 25 produces a strong drag bar which holds the drag bars and disk against lateral displacement while permitting freedom of movement in a vertical plane, and the whole construction is not only cheap to manufacture and easy to assemble but is also strong, serviceable and durable in operation.

While I have shown and described one preferred embodiment of my invention it should be obvious that the details of construction illustrated and described are capable of considerable modification without departing from the essence of the invention as defined in the following claims.

I claim:

1. The combination of a support, a pivotal member carried thereby, a drag bar having a slotted head adapted to be engaged with said pivotal member, and means for preventing disengagement of the drag bar from said member during normal movements of the drag bar but permitting disengagement when said drag bar is swung into an abnormal position.

2. The combination of a pivot member, a drag bar having a head mounted thereon comprising a plurality of spaced ears each provided with an open-ended slot adapted to receive said pivot member, and means disposed over said pivot member for preventing disengagement of said ears from said member except upon movement of the drag bar to abnormal position.

3. The combination of a bracket, a pivot member carried by said bracket, a drag bar having a head provided with a plurality of spaced slotted ears pivotally engaging said member, and means for preventing disengagement of said ears from said member.

4. The combination of a frame of angle iron construction, a bracket mounted on said frame within the angle thereof, a pivot member carried by said bracket, a drag bar head comprising a pair of spaced ears, each provided with an open-ended slot adapted to fit over said pivot member, said parts being so proportioned and arranged that one flange of said frame serves to prevent disengagement of the drag bar head from said pivot member except upon movement of said head to a predetermined position.

5. The combination of a frame, a bracket mounted thereon provided with a plurality of open-ended slots, a pivot member seated in said slots, and a drag bar head pivotally and detachably mounted on said pivot member.

6. The combination of a frame, a slotted bracket mounted thereon, a pivot member seated in the slots of said bracket, and a slotted drag bar head mounted on said pivot member.

7. The combination of a grain drill frame of angle iron construction, a bracket mounted in the angle of said frame and having a pair of rearwardly extending projections, each provided with a vertical open-ended slot, a headed pivot member supported in said slots, a drag bar, a head connected thereto provided with a pair of spaced ears each having an open-ended downwardly extending slot adapted to fit over said pivot member, the overlying flange of said frame being adapted to maintain said parts in coöperative relation to each other.

FREDERICK K. HURXTHAL.

Copies of this patent may be obtained for five cents each, by addressing the "Commissioner of Patents, Washington, D. C."